US009065633B2

(12) United States Patent
Yamada et al.

(10) Patent No.: US 9,065,633 B2
(45) Date of Patent: Jun. 23, 2015

(54) WIRELESS COMMUNICATION APPARATUS FOR SETTING FREQUENCY BAND FOR WIRELESS COMMUNICATIONS USING ENCRYPTION KEY INFORMATION TO PREDETERMINED FREQUENCY BAND

(71) Applicant: PANASONIC INTELLECTUAL PROPERTY MANAGEMENT CO., LTD., Osaka (JP)

(72) Inventors: Toyoshi Yamada, Osaka (JP); Nobuhiko Arashin, Osaka (JP); Osamu Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/648,630

(22) Filed: Oct. 10, 2012

(65) Prior Publication Data
US 2013/0182846 A1 Jul. 18, 2013

Related U.S. Application Data

(63) Continuation of application No. PCT/JP2012/002531, filed on Apr. 12, 2012.

(30) Foreign Application Priority Data

Apr. 15, 2011 (JP) ................................. 2011-090776

(51) Int. Cl.
*H04L 9/08* (2006.01)
*H04W 12/02* (2009.01)
*H04L 29/06* (2006.01)

(52) U.S. Cl.
CPC ...... *H04L 9/08* (2013.01); *H04L 63/04* (2013.01); *H04L 2209/80* (2013.01); *H04W 12/02* (2013.01)

(58) Field of Classification Search
CPC ...... H04L 9/08; H04L 2209/80; H04W 12/02
USPC ........................................................ 380/270
See application file for complete search history.

(56) References Cited

U.S. PATENT DOCUMENTS

| 7,424,268 B2 * | 9/2008 | Diener et al. ................. 455/62 |
| 7,577,453 B2 * | 8/2009 | Matta ........................... 455/509 |

(Continued)

FOREIGN PATENT DOCUMENTS

| JP | 2004-96336 | 3/2004 |
| JP | 2006-314009 | 11/2006 |

(Continued)

OTHER PUBLICATIONS

International Search Report issued May 22, 2012 in International (PCT) Application No. PCT/JP2012/002531.

(Continued)

*Primary Examiner* — Tae Kim
*Assistant Examiner* — Louis Teng
(74) *Attorney, Agent, or Firm* — Wenderoth, Lind & Ponack, L.L.P.

(57) ABSTRACT

A controller receives first or second equipment identifier from a first wireless communication apparatus, by using one wireless communication circuit of the third and fourth wireless communication circuit. When the one wireless communication circuit is the fourth wireless communication circuit, the controller sets an encryption key information for wireless communications with the first wireless communication apparatus, to encryption key information including an equipment identifier that does not coincide with a received equipment identifier among the received plurality of encryption key information, and controls the third wireless communication circuit to transmit and receive encrypted transmission data to and from the first wireless communication apparatus by using key data included in set encryption key information.

5 Claims, 9 Drawing Sheets

(56) References Cited

U.S. PATENT DOCUMENTS

| | | | |
|---|---|---|---|
| 7,593,730 B2* | 9/2009 | Khandelwal et al. | 455/435.2 |
| 8,064,939 B2* | 11/2011 | Matta | 455/509 |
| 8,320,949 B2* | 11/2012 | Matta | 455/509 |
| 2004/0028003 A1* | 2/2004 | Diener et al. | 370/319 |
| 2006/0190724 A1 | 8/2006 | Adams et al. | |
| 2006/0268767 A1 | 11/2006 | Sato et al. | |
| 2009/0323608 A1 | 12/2009 | Adachi et al. | |
| 2010/0034120 A1 | 2/2010 | Nakajima | |
| 2010/0166186 A1* | 7/2010 | Shiba | 380/278 |
| 2011/0058536 A1 | 3/2011 | Tsuchiya et al. | |

FOREIGN PATENT DOCUMENTS

| | | |
|---|---|---|
| JP | 2010-11397 | 1/2010 |
| JP | 2010-41666 | 2/2010 |
| JP | 2010-157889 | 7/2010 |
| JP | 2011-61507 | 3/2011 |

OTHER PUBLICATIONS

International Preliminary Report on Patentability and Written Opinion of the International Searching Authority issued Oct. 24, 2013 in International (PCT) Application No. PCT/JP2012/002531.

* cited by examiner

WIRELESS COMMUNICATION APPARATUS FOR SETTING FREQUENCY BAND FOR WIRELESS COMMUNICATIONS USING ENCRYPTION KEY INFORMATION TO PREDETERMINED FREQUENCY BAND

This is a continuation application of International application No. PCT/JP2012/002531 as filed on Apr. 12, 2012, which claims priority to Japanese patent application No. JP 2011-090776 as filed on Apr. 15, 2011, the contents of which are incorporated herein by reference.

BACKGROUND OF THE INVENTION

1. Field of the Invention

The present disclosure relates to a wireless communication apparatus and a wireless communication method for the wireless communication apparatus.

2. Description of the Related Art

BACKGROUND ART

In recent years, wireless communication technologies using wireless LAN (Local Area Network) have been developed. Generally speaking, in wireless LAN communications, it has been recommended to give confidentiality to data to be transmitted by performing authentication with the wireless communication apparatus of the data transmission destination and by sharing an encryption key with the same wireless communication apparatus before transmitting the data of video contents or the like. In order to share an encryption key by authentication of another party of communication, it is required to preliminarily set setting values of a number of setting items such as a service set identifier (referred to as an SSID hereinafter), an encryption type, and an encryption key. Conventionally, the user has been required to input the setting values of a number of setting items by using some input means. In addition, in order to determine the setting values, knowledge of the wireless LAN has been also necessary. Therefore, even when the user has an equipment supporting the wireless communication function, the user sometimes does not use the same function in practice.

In addition, conventionally, the equipment on which the wireless LAN communication function is mounted at home has been mainly a personal computer, however, the wireless LAN communication function has come to be mounted also on AV (Audio and Visual) equipments in recent years. In the case of AV equipment, the user interface thereof is often simpler than that of the personal computer. Therefore, much time is necessary for inputting the setting values of a number of setting items for the wireless LAN communications. In addition, the users of AV equipments cover a wide variety of age groups as compared with the user age group of personal computers. Therefore, it is supposed that the users of AV equipment include numbers of people who do not have any knowledge of the wireless LAN. Therefore, it is indispensable to provide a simple method of executing the connection setting of the wireless LAN and the setting of security.

The Wi-Fi Alliance provides a WPS (Wi-Fi Protected Setup) Standard for simply executing the connection setting of the wireless LAN and the setting of security. In addition, in the Patent Document 1, there is described a wireless communication system, in which a plurality of base station apparatuses for performing wireless communications by using mutually different frequencies are provided, and the base station apparatuses and substation apparatuses perform wireless communications. The base station apparatus includes substation apparatus identification information storage means for storing information for identifying substation apparatuses serviced by the base station apparatus, and substation apparatus identification information wireless transmission means for wirelessly transmitting the identification information stored in the substation apparatus identification information storage means by using a frequency allocated to the base station apparatus. In addition, the substation apparatus has wireless receiving means for performing wireless receiving by using a switchable frequency, identification information storage means for storing the identification information of the substation apparatus, and wireless receiving frequency control means. The wireless receiving frequency control means performs wireless receiving by the wireless receiving means with switching the frequency used for wireless receiving, to detect a frequency when the identification information that coincides with the identification information stored in the identification information storage means is wirelessly received from the base station apparatus, and performs setting so as to perform wireless receiving from the base station apparatus by using the detected frequency. Therefore, it is possible to simplify the setting process of the frequency used for the wireless receiving by the substation apparatus. Prior art documents related to the present disclosure are listed below:

Patent Document 1: Japanese Patent Laid-open Publication No. 2004-96336 A;

Patent Document 2: Japanese Patent Laid-open Publication No. 2010-011397 A;

Patent Document 3: Japanese Patent Laid-open Publication No. 2010-041666 A;

Patent Document 4: Japanese Patent Laid-open Publication No. 2006-314009 A;

Patent Document 5: U.S. Patent Application No. 2010/0034120;

Patent Document 6: U.S. Patent Application No 2009/0323608; and

Patent Document 7: U.S. Patent Application No 2006/0190724.

In the case where the wireless LAN communication function has been mounted on a personal computer, the function has been used mainly for WEB browsing. On the other hand, in the case where the wireless LAN communication function is mounted on AV equipment, a more stable radio wave propagation environment is required since it is supposed that the function is used for the streaming of high-quality video contents data. For example, both of a 2.4-GHz band and a 5-GHz band can be utilized in the wireless LAN communications complying with IEEE802.11n. However, it is desirable to utilize the 5-GHz band that can provide a stable wireless LAN communication environment in which possibility of the interfere among wireless signals is smaller than that of the 2.4-GHz band, in order to achieve wireless transmission of the streaming data of the video contents data or the like.

However, in the wireless communication system described in the Patent Document 1, the substation apparatus detects a frequency when the identification information that coincides with the identification information of the substation apparatus is wirelessly received from the base station apparatus, and sets so as to perform wireless receiving from the base station apparatus by using the detected frequency. Therefore, the substation apparatus cannot designate the frequency for wireless connection to the base station apparatus. In addition, the information transmitted and received by using a protocol defined by the WPS Standard does not include information for designating the frequency band for wireless communications. Therefore, wireless communications cannot be performed by designating the frequency band according to the WPS Standard.

In addition, generally speaking, when one encryption key information is selected from among a plurality of encryption key information and is used for wireless in the communications compliant with the WPS Standard, the encryption key information of the higher encryption strength is selected. However, when there are a plurality of encryption key information for encryption system having an identical encryption strength and for different frequency bands, the one key information selected from among the plurality of encryption key information depends on implementation since the frequency band cannot be designated according to the WPS Standard. Namely, there has been such a problem that the stable wireless LAN communication environment has not been provided when the encryption key information for performing communications in the frequency band, in which the interference among the wireless signals tends to occur, has unfortunately been selected even if the encryption key information of a high encryption strength has been selected.

SUMMARY OF THE INVENTION

It is an object of the present disclosure to provide a wireless communication apparatus and a wireless communication method for the wireless communication apparatus each capable of solving the aforementioned problems and capable of setting a frequency band for wireless communications using encryption key information to a predetermined frequency band.

According to the first aspect of the present disclosure, there is provided a wireless communication apparatus that is a second wireless communication apparatus operable to transmit and receive encrypted transmission data to and from a first wireless communication apparatus comprising first and second wireless communication circuit. The first wireless communication circuit has a first equipment identifier and executes wireless communications in a predetermined first frequency band, and the second wireless communication circuit has a second equipment identifier and executes wireless communications in a predetermined second frequency band. The first wireless communication apparatus transmits a plurality of encryption key information each including key data for encrypting transmission data and the equipment identifier of the first or second wireless communication circuit that transmits and receives the encrypted transmission data. The second wireless communication apparatus includes a third wireless communication circuit operable to execute wireless communications with the first wireless communication circuit in the first frequency band, a fourth wireless communication circuit operable to execute wireless communications with the second wireless communication circuit in the second frequency band, and a controller configured to control the third and fourth wireless communication circuits. The controller receives the first or second equipment identifier from the first wireless communication apparatus, by using one wireless communication circuit of the third and fourth wireless communication circuits. The controller receives the plurality of encryption key information from the first wireless communication apparatus. When the one wireless communication circuit is the third wireless communication circuit, the controller sets the encryption key information for wireless communications with the first wireless communication apparatus, to encryption key information including an equipment identifier that coincides with a received equipment identifier among the received plurality of encryption key information, and controls the third wireless communication circuit to transmit and receive the encrypted transmission data to and from the first wireless communication apparatus by using the key data included in set encryption key information. When the one wireless communication circuit is the fourth wireless communication circuit, the controller sets the encryption key information for wireless communications with the first wireless communication apparatus to encryption key information including an equipment identifier that does not coincide with the received equipment identifier among the received plurality of encryption key information, and controls the third wireless communication circuit to transmit and receive the encrypted transmission data to and from the first wireless communication apparatus by using the key data included in set encryption key information.

In the above described wireless communication apparatus, the equipment identifier is preferably BSSID (Basic Service Set Identifier).

In addition, in the above described wireless communication apparatus, preferably, the first frequency band is a 5-GHz band, and the second frequency band is a 2.4-GHz band.

Further, in the above-described wireless communication apparatus, the controller preferably receives the first or second equipment identifier from the first wireless communication apparatus by executing a predetermined process compliant with WPS (Wi-Fi Protected Setup) Standard.

According to the second aspect of the present disclosure, there is provided a wireless communication method for a second wireless communication apparatus operable to transmit and receive encrypted transmission data to and from a first wireless communication apparatus comprising first and second wireless communication circuit. The first wireless communication circuit has a first equipment identifier and executes wireless communications in a predetermined first frequency band. The second wireless communication circuit has a second equipment identifier and executes wireless communications in a predetermined second frequency band. The first wireless communication apparatus transmits a plurality of encryption key information each including key data for encrypting transmission data and the equipment identifier of the first or second wireless communication circuit that transmits and receives the encrypted transmission data. The second wireless communication apparatus includes a third wireless communication circuit operable to execute wireless communications with the first wireless communication circuit in the first frequency band, a fourth wireless communication circuit operable to execute wireless communications with the second wireless communication circuit in the second frequency band, and a controller configured to control the third and fourth wireless communication circuits. The wireless communication method includes steps executed by the controller of:

receiving the first or second equipment identifier from the first wireless communication apparatus by using one wireless communication circuit of the third and fourth wireless communication circuits, receiving the plurality of encryption key information from the first wireless communication apparatus, when the one wireless communication circuit is the third wireless communication circuit, setting the encryption key information for wireless communications with the first wireless communication apparatus, to encryption key information including an equipment identifier that coincides with a received equipment identifier among the received plurality of encryption key information, and controlling the third wireless communication circuit to transmit and receive the encrypted transmission data to and from the first wireless communication apparatus by using the key data included in set encryption key information, and when the one wireless communication circuit is the fourth wireless communication circuit, setting the encryption key information for wireless communications with the first wireless communication apparatus to encryption key information including an equipment identifier that does not coincide with the received equipment identifier among the received plurality of encryption key information, and controlling the third wireless communication circuit to transmit and receive the encrypted transmission data to and from the first wireless communication apparatus by using the key data included in set encryption key information.

According to the wireless communication apparatus and the wireless communication method of the present disclosure, the controller receives the first or second equipment identifier from the first wireless communication apparatus, by using one wireless communication circuit of the third and fourth wireless communication circuits. The controller receives the plurality of encryption key information from the first wireless communication apparatus. When the one wireless communication circuit is the third wireless communication circuit, the controller sets the encryption key information for wireless communications with the first wireless communication apparatus, to encryption key information including an equipment identifier that coincides with a received equipment identifier among the received plurality of encryption key information, and controls the third wireless communication circuit to transmit and receive the encrypted transmission data to and from the first wireless communication apparatus by using the key data included in set encryption key information. When the one wireless communication circuit is the fourth wireless communication circuit, the controller sets the encryption key information for wireless communications with the first wireless communication apparatus to encryption key information including an equipment identifier that does not coincide with the received equipment identifier among the received plurality of encryption key information, and controls the third wireless communication circuit to transmit and receive the encrypted transmission data to and from the first wireless communication apparatus by using the key data included in set encryption key information. Therefore, the frequency band for wireless communications using the encryption key information can be set to the first frequency band based on the equipment identifier and the plurality of encryption key information received from the first wireless communication apparatus.

BRIEF DESCRIPTION OF THE DRAWINGS

These and other objects and features of the present disclosure will become clear from the following description taken in conjunction with the preferred embodiments thereof with reference to the accompanying drawings throughout which like parts are designated by like reference numerals, and in which.

DETAILED DESCRIPTION OF THE INVENTION

Figure 1:
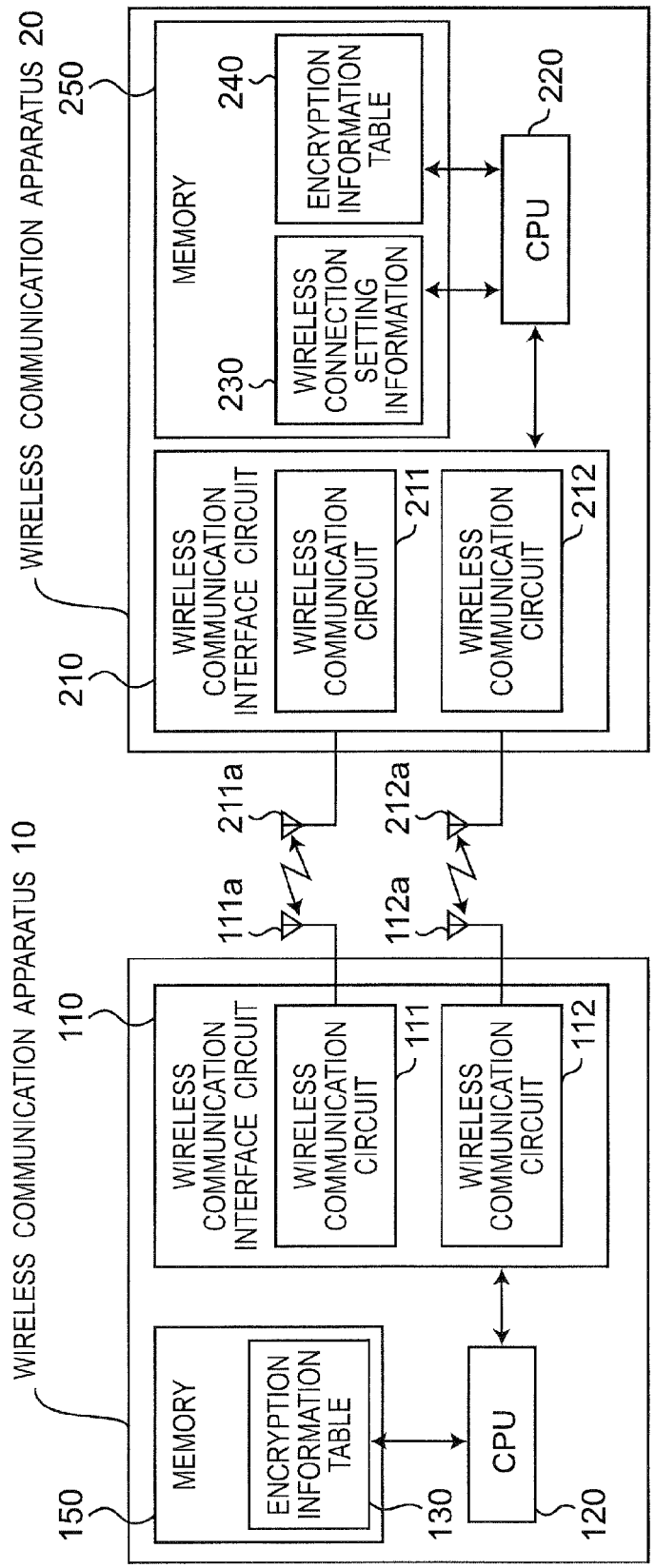
FIG. 1 is a block diagram showing a configuration of a wireless communication system including a wireless communication apparatus 10 and a wireless communication apparatus 20 according to a first preferred embodiment of the present disclosure.

Preferred embodiments of the present disclosure will be described hereinafter with reference to the drawings. In the preferred embodiments, components similar to each other are denoted by the same reference numerals.

First Preferred Embodiment

FIG. 1 is a block diagram showing a configuration of a wireless communication system including a wireless communication apparatus 10 and a wireless communication apparatus 20 according to the first preferred embodiment of the present disclosure. Referring to FIG. 1, the wireless communication apparatus 10 is a registrar equipment complying with the WPS Standard, and provides communication parameters such as a network identifier and encryption key information required for wireless LAN connection, for other wireless communication apparatuses. Concretely speaking, the wireless communication apparatus 10 is a repeater apparatus such as an access point apparatus, for example. In addition, the wireless communication apparatus 20 is an enrollee equipment complying with the WPS Standard, and receives the communication parameters from the registrar equipment and sets the communication parameters for wireless connection to the registrar equipment. Concretely speaking, the wireless communication apparatus 20 is and AV equipment such as a portable equipment or a television receiver, for example.

Referring to FIG. 1, the wireless communication apparatus 10 is configured to include a wireless communication interface circuit 110, a CPU (Central Processing Unit) 120, and a memory 150. In addition, the wireless communication interface circuit 110 is configured to include wireless communication circuits 111 and 112, and the memory 150 previously stores an encryption information table 130. In this case, the CPU 120 is connected to the memory 150, the wireless communication interface circuit 110, and the other components (not shown) to control them, and execute various software functions. In addition, the wireless communication circuit 111 has an antenna 111a, and performs wireless LAN communications complying with IEEE802.11n via the antenna 111a by utilizing a predetermined channel in the 2.4-GHz band. Further, the wireless communication circuit 112 has an antenna 112a, and performs wireless LAN communications complying with IEEE802.11n via the antenna 112a by utilizing a predetermined channel in the 5-GHz band. In this case, the CPU 120 operates at least one of the wireless communication circuits 111 and 112. In addition, an unique equipment identifier (BSSID (Basic Service Set IDentifier)) such as a MAC (Media Access Control) address is allocated to each of the wireless communication circuits 111 and 112. In the present preferred embodiment, the equipment identifier of the wireless communication circuit 111 is BSSID_A, and the equipment identifier of the wireless communication circuit 112 is BSSID_B.

Figure 2:
FIG. 2 is a table showing one example of an encryption information table 130 of FIG. 1.

FIG. 2 is a table showing one example of the encryption information table 130 of FIG. 1. Referring to FIG. 2, the encryption key information table 130 includes four encryption key information 1 to 4. In this case, each of the encryption key information includes information on an encryption type (an encryption method), key data for encrypting transmission data of video contents data or the like and for decrypting the encrypted data, an SSID which is the network identifier of the communication apparatus 10, and a BSSID which is the equipment identifier of the wireless communication circuit 111 or 112 that transmits and receives the encrypted transmission data. The encryption type represents the standard of the encryption system of, for example, AES (Advanced Encryption Standard), TKIP (Temporal Key Integrity) or WEP (Wired Equivalent Privacy). Referring to FIG. 2, the encryption key information including an identical equipment identifier are used in an identical frequency band. For example, the encryption key information 1 and 2 include the equipment identifier BSSID_A of the wireless communication circuit 111, and therefore, the encryption key information 1 and 2 are used for wireless communications in the 2.4-GHz band. Further, the encryption key information 3 and 4 include the equipment identifier BSSID_B of the wireless communication circuit 112, and therefore, the encryption key information 3 and 4 are used for wireless communications in the 5-GHz band. In addition, the encryption key information 1 and 3 utilize an identical encryption system (AES), however, the encryption key information 1 and 3 are used in different frequency bands. The encryption key information 2 and 4 utilize an identical encryption system (TKIP), however, the encryption key information 2 and 4 are used in different frequency bands.

Referring to FIG. 1, the wireless communication apparatus 20 is configured to include a wireless communication interface circuit 210, a CPU 220, and a memory 250. In addition, the wireless communication interface circuit 210 is configured to include wireless communication circuits 211 and 212, and the memory 250 stores a wireless connection setting information 230 and an encryption information table 240 as described in detail later. In this case, the CPU 220 is connected to the memory 250, the wireless communication interface circuit 210 and the other components (not shown) to control them, and execute various software functions such as a program including steps of a wireless connection process of FIG. 4 described in detail later. In addition, the wireless communication circuit 211 has an antenna 211a, and performs wireless LAN communications complying with IEEE802.11n via the antenna 211a by using a predetermined channel in the 2.4-GHz band. Further, the wireless communication circuit 212 has an antenna 212a, and performs wireless LAN communications complying with IEEE802.11n via the antenna 212a by using a predetermined channel in the 5-GHz band. In this case, the CPU 220 performs selectively switches over to one of the wireless communication circuits 211 and 212, and operates the selected wireless communication circuit.

Referring to FIG. 1, the wireless communication apparatuses 10 and 20 perform wireless communications by using the 2.4-GHz band via the wireless communication circuits 111 and 211, or perform wireless communications by using the 5-GHz band via the wireless communication circuits 112 and 212. It is noted that interference among wireless signals occurs less in the 5-GHz band than in the 2.4-GHz band.

Figure 3:
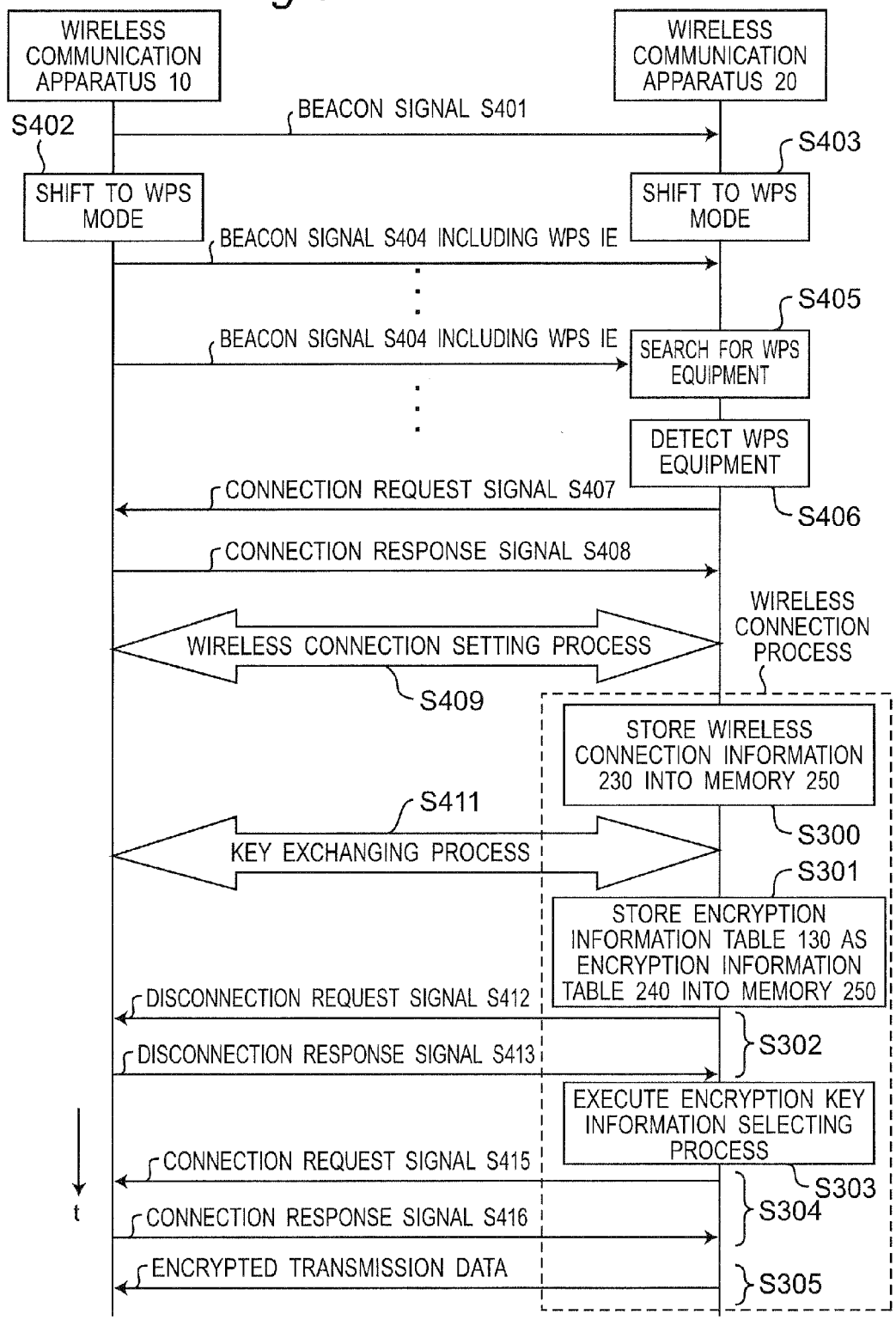
FIG. 3 is a timing chart showing an operation of the wireless communication system of FIG. 1.

FIG. 3 is a timing chart showing an operation of the wireless communication system of FIG. 1. It is noted that the subjects of the wireless communication apparatus 10 and 20 are the CPUs 120 and 220, respectively, and descriptions of the CPUs 120 and 220 are omitted below. Referring to FIG. 3, the wireless communication apparatus 10 broadcasts a beacon signal S401 at predetermined time intervals (e.g., 100 milliseconds) by using the wireless communication circuits 111 and 112 before shift to the WPS mode, in which a wireless connection setting process compliant with the WPS Standard is performed. Next, when the user performs predetermined operation defined by the WPS Standard to shift each of the wireless communication apparatuses 10 and 20 to the WPS mode, the wireless communication apparatus 10 shifts to the WPS mode at step S402, and the wireless communication apparatus 20 shifts to the WPS mode at step S403. Concretely speaking, the user can shift the wireless communication apparatuses 10 and 20 to the WPS mode by the operation of simultaneously pushing predetermined push buttons (not shown) provided for the wireless communication apparatuses 10 and 20, or by the operation of inputting a predetermined identifier, which is set in the wireless communication apparatus 20, to the wireless communication apparatus 10.

Next, the wireless communication apparatus 10 broadcasts a beacon signal S404 including a WPS information element (Wireless Provisioning Services Information Element, referred to as a WPS IE hereinafter) at predetermined time intervals by using the wireless communication circuits 111 and 112, in place of the beacon signal S401. In this case, the WPS information element represents that the wireless communication apparatus 10 has shifted to the WPS mode. On the other hand, the wireless communication apparatus 20 shifts to the WPS mode at step S403, and thereafter, searches for another wireless communication apparatus that has shifted to the WPS mode (referred to as a WPS equipment hereinafter) at step S405. Concretely speaking, the wireless communication apparatus 20 judges whether or not the beacon signal S404 can be received with repetitively switching over between the wireless communication circuits 211 and 212 by a predetermined number of times at predetermined time intervals. Then, the wireless communication apparatus 20 detects the WPS equipment (wireless communication apparatus 10 in the present preferred embodiment) by receiving the beacon signal S404 at step S406.

Next, the wireless communication apparatus 20 wirelessly transmits to the wireless communication apparatus 10 a connection request signal S407, which is an association request signal, for example. In response to this, the wireless communication apparatus 10 wirelessly transmits to the wireless communication apparatus 20 a connection response signal S408, which is an association response signal, for example. Then, the wireless communication apparatuses 10 and 20 execute a predetermined wireless connection setting process compliant with the WPS Standard at step S409. By executing the wireless connection setting process, the wireless communication apparatus 20 receives the equipment identifier of a wireless communication circuit, which is used for the wireless connection setting process and is selected from the wireless communication circuits 111 and 112. In this case, the wireless communication apparatus 20 performs transmitting and receiving of the connection request signal S407 and the connection response signal S408 and the wireless connection setting process, by using one of the wireless communication circuits 211 and 212 which was used when the wireless communication apparatus 20 detected the wireless communication apparatus 10 at step S406. When the beacon signal S404 could be received by both of the wireless communication circuits 211 and 212, the transmitting and receiving of the connection request signal S407 and the connection response signal S408 and the wireless connection setting process at step S409 are performed by using the wireless communication circuit 212 for wireless communications in the 5-GHz band.

Figure 4:
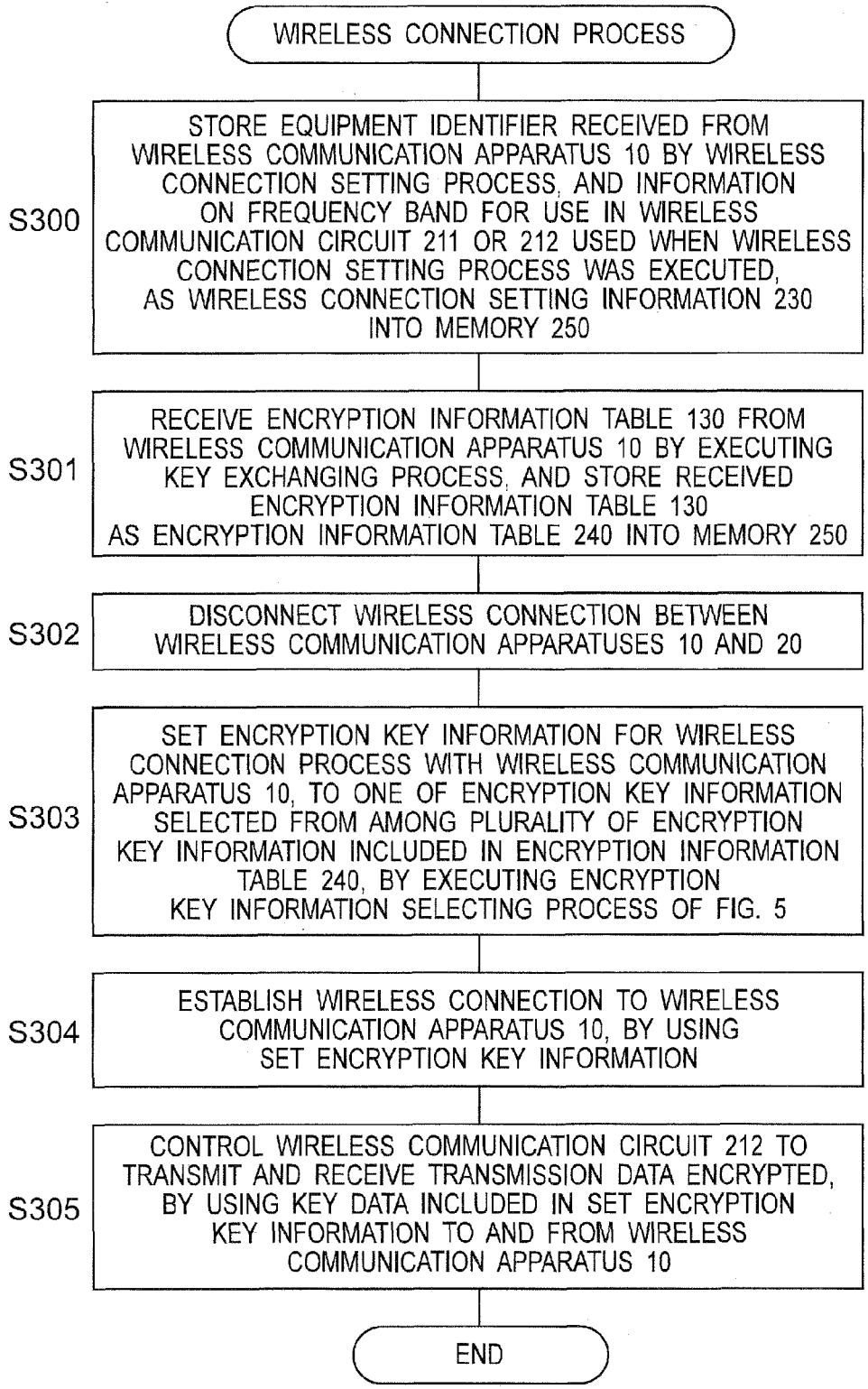
FIG. 4 is a flow chart showing a wireless connection process executed by a CPU 220 of FIG. 1.

Next, the wireless communication apparatus 20 executes the wireless connection process of FIG. 4. FIG. 4 is a flow chart showing the wireless connection process executed by the CPU 220 of FIG. 1. First of all, at step S300 of FIG. 4, the CPU 220 stores the equipment identifier received from the wireless communication apparatus 10 by the wireless connection setting process and the information on a frequency band for use in the wireless communication circuit 211 or 212 used when the wireless connection setting process was executed, as wireless connection setting information 230 into the memory 250. Next, at step S301, the CPU 220 receives the encryption information table 130 from the wireless communication apparatus 10 by executing a predetermined key exchanging process (See step S411 of FIG. 3) compliant with the WPS Standard between the CPU 220 and the wireless communication apparatuses 10, and stores the received table as an encryption information table 240 into the memory 250. In the key exchanging process of step S411, the wireless communication apparatus 10 transmits all of the encryption key information 1 to 4 in the encryption information table 130 to the wireless communication apparatus 20. Further, at step S302, the CPU 220 disconnects the wireless connection between the wireless communication apparatuses 10 and 20. Concretely speaking, as shown in FIG. 3, the wireless communication apparatus 20 transmits a disconnection request signal S412 to the wireless communication apparatus 10, and the wireless communication apparatus 10 transmits a disconnection response signal S413 to the wireless communication apparatus 20 in response to the disconnection request signal S412. It is noted that the wireless communication apparatus 20 uses at steps S300 to S302 a wireless communication circuit, which was used in the wireless connection setting process at step S409 of FIG. 3, out of the wireless communication circuits 211 and 212.

Next, by executing an encryption key information selecting process of FIG. 5 described in detail later at step S303, the CPU 220 sets the encryption key information for wireless communications with the wireless communication apparatus 10, to one of the encryption key information selected from among the plurality of encryption key information included in the encryption information table 240. Then, at step S304, wireless connection to the wireless communication apparatus 10 is established, by using the set encryption key information. Concretely speaking, as shown in FIG. 3, the wireless communication apparatus 20 transmits a connection request signal S415 to the wireless communication apparatus 10, and the wireless communication apparatus 10 transmits a connection response signal S416 to the wireless communication apparatus 20 in response to the connection request signal S415. Further, at step S305, the CPU 220 controls the wireless communication circuit 212 to transmit and receive transmission data encrypted, by using the key data included in the set encryption key information to and from the wireless communication apparatus 10, and the wireless connection process is ended.

It is noted that the transmitting and receiving of the connection request signal S415 and the connection response signal S416 at step S304, and the transmitting and receiving of the encrypted transmission data at step S305 are performed by using the wireless communication circuit 212. Namely, the wireless communication apparatuses 10 and 20 encrypt the transmission data by using the key data included in the encryption key information set at step S303, transmit and receive the encrypted transmission data by using the wireless communication circuits 112 and 212, and decrypt the received encrypted transmission data by using the key data included in the encryption key information set at step S303.

Figure 5:
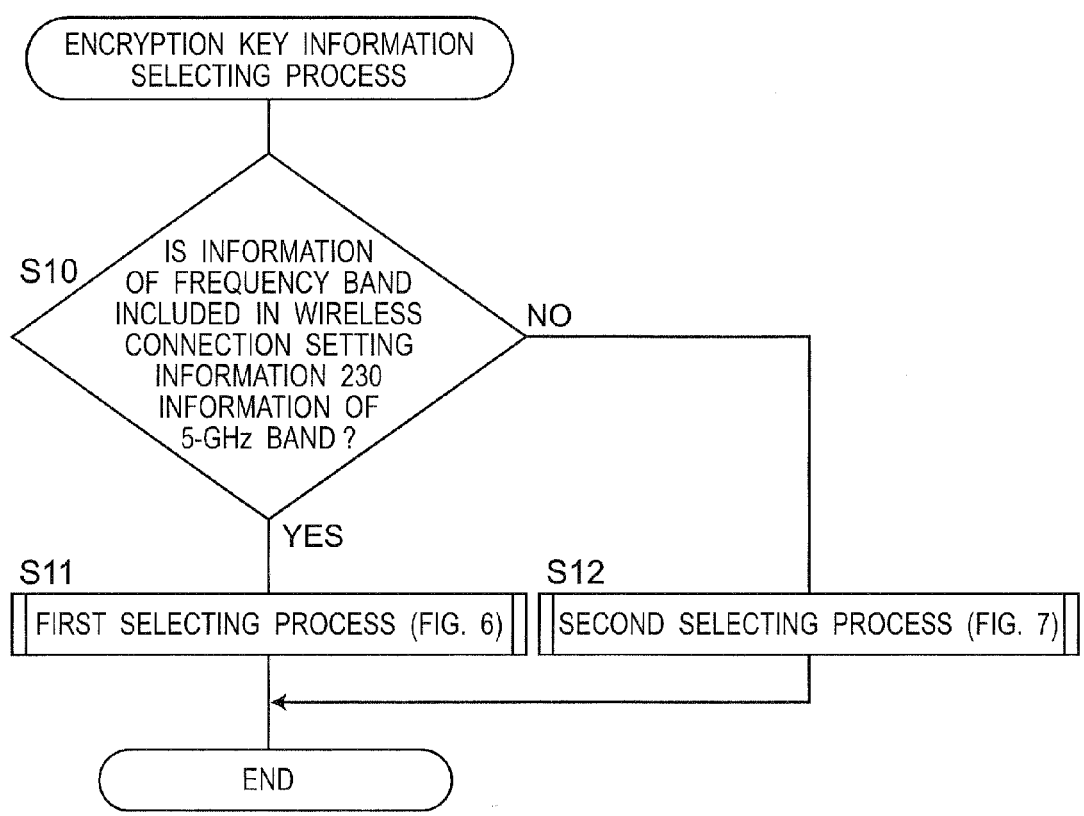
FIG. 5 is a flow chart showing an encryption key information selecting process executed at step S303 of FIG. 4.
Figure 6:
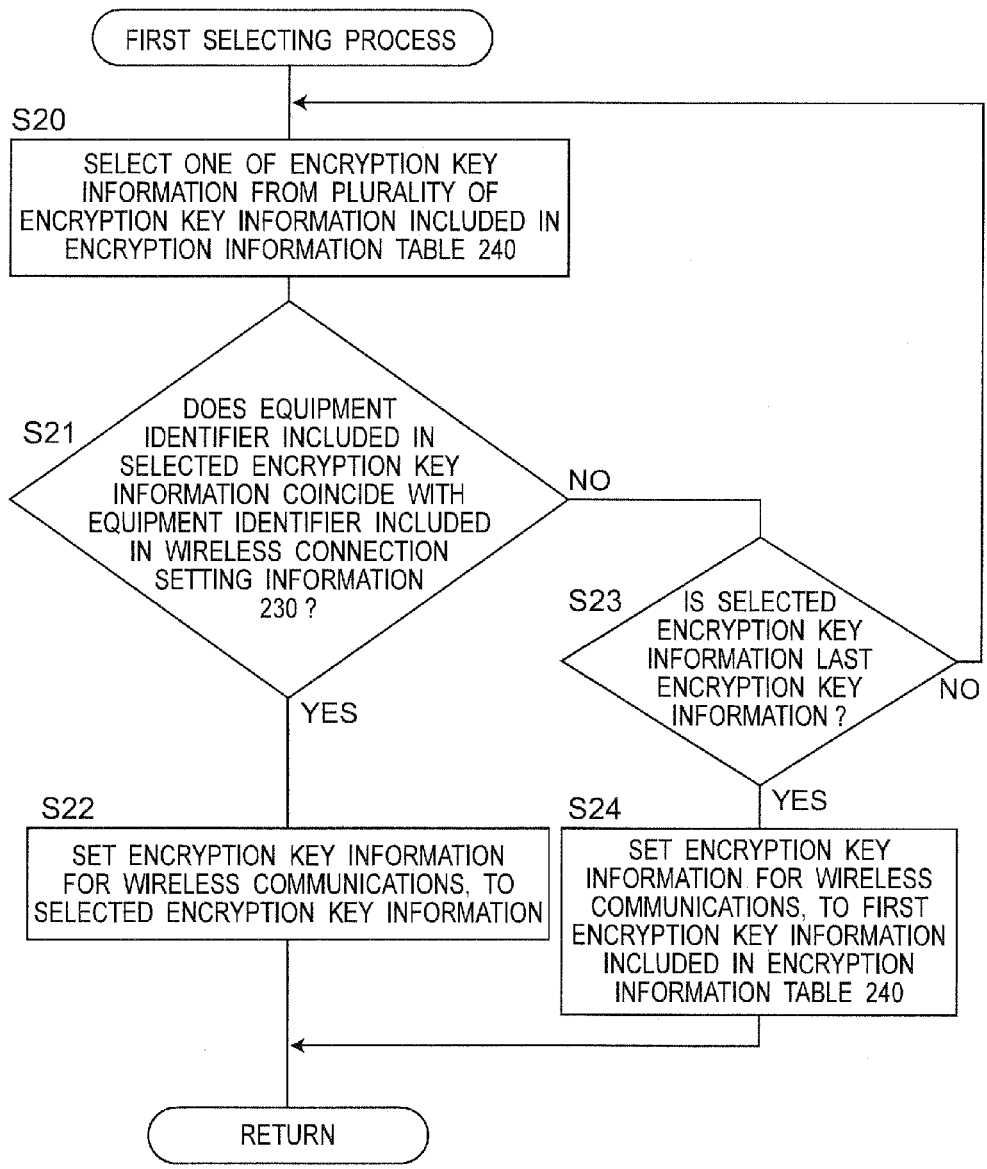
FIG. 6 is a flow chart showing a first selecting process executed at step S11 of FIG. 5.
Figure 7:
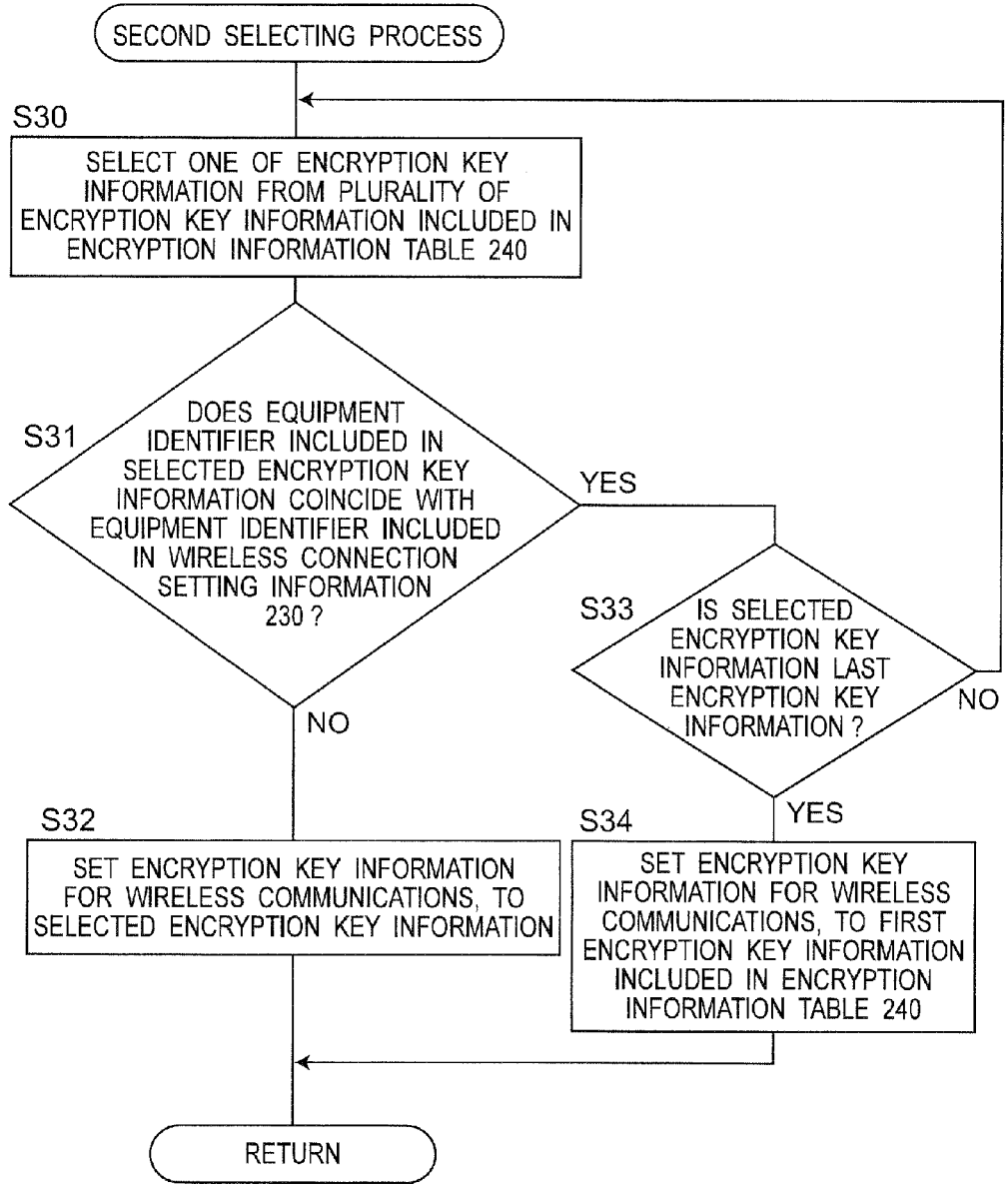
FIG. 7 is a flow chart showing a second selecting process executed at step S12 of FIG. 5.

FIG. 5 is a flow chart showing the encryption key information selecting process executed at step S303 of FIG. 4. At step S10 of FIG. 5, the CPU 220 judges whether or not the information on the frequency band included in the wireless connection setting information 230 is the information on the 5-GHz band. Namely, the CPU 220 judges whether or not the wireless communication circuit used when the equipment identifier was received from the wireless communication apparatus 10 by the wireless connection setting process of FIG. 3 is the wireless communication circuit 212. If YES at step S10, then a first selecting process of FIG. 6 is executed at step S11. On the other hand, if NO at step S10, then a second selecting process of FIG. 7 is executed at step S12. Then, the encryption key information selecting process is ended.

FIG. 6 is a flow chart showing the first selecting process executed at step S11 of FIG. 5. At step S20 of FIG. 6, the CPU 220 selects one of encryption key information from the plurality of encryption key information included in the encryption information table 240. Next, at step S21, the CPU 220 judges whether or not the equipment identifier included in the selected encryption key information coincides with the equipment identifier included in the wireless connection setting information 230. If YES at step S21, then the control flow goes to step S22. On the other hand, if NO at step S21, then the control flow goes to step S23.

At step S22 of FIG. 6, the CPU 220 sets the encryption key information for wireless communications to the selected encryption key information, and the control flow returns the encryption key information selecting process of FIG. 5. On the other hand, the CPU 220 judges at step S23 whether or not the selected encryption key information is the last encryption key information. If YES at step S23, then the control flow goes to step S24. On the other hand, if NO at step S23, then the control flow returns to step S20 to select the next encryption key information. At step S24, the CPU 220 sets the encryption key information for wireless communications, to the first encryption key information included in the encryption information table 240, and the control flow returns to the encryption key information selecting process of FIG. 5.

FIG. 7 is a flow chart showing the second selecting process executed at step S12 of FIG. 5. At step S30 of FIG. 7, the CPU 220 selects one encryption key information from among the plurality of encryption key information included in the encryption information table 240. Next, the CPU 220 judges at step S31 whether or not the equipment identifier included in the selected encryption key information coincides with the equipment identifier included in the wireless connection setting information 230. If YES at step S31, then the control flow goes to step S33. On the other had, if NO at step S31, then the control flow goes to step S32.

At step S32 of FIG. 7, the CPU 220 sets the encryption key information for wireless communications to the selected encryption key information, and the control flow returns to the encryption key information selecting process of FIG. 5. On the other hand, the CPU 220 judges at step S33 whether or not the selected encryption key information is the last encryption key information. If YES at step S33, then the control flow goes to step S34. On the other hand, if NO at step S33, then the control flow returns to step S30 to select the next encryption key information. At step S34, the CPU 220 sets the encryption key information for wireless communications, to the first encryption key information included in the encryption information table 240, and the control flow returns to the encryption key information selecting process of FIG. 5.

Next, operation examples of the wireless communication system of FIG. 1 is described concretely.

(1) First Operation Example

In the first operation example, it is assumed that the wireless connection setting process was executed in the 5-GHz band by using the wireless communication circuits 112 and 212 at step S409 of FIG. 3. In this case, the wireless communication apparatus 20 acquires the equipment identifier BSSID_B of the wireless communication circuit 112 at step S300 of FIG. 4, and stores the acquired equipment identifier BSSID_B and the information on the frequency band (5-GHz band) for use in the wireless communication circuit 212 used when the wireless connection setting process was executed, as the wireless connection setting information 230 into the memory 250. Then, the CPU 220 acquires the encryption key information table 130 of the wireless communication apparatus 10 at step S301 of FIG. 4, stores the encryption key information table 130 as the encryption information table 240 into the memory 250, and disconnects the wireless connection between the wireless communication apparatuses 10 and 20 at step S302.

In the present operation example, the information on the frequency band included in the wireless connection setting information 230 is the information on the 5-GHz band (YES at step S10 of FIG. 5), and therefore, the CPU 220 executes the first selecting process of FIG. 6. First of all, in the first selecting process, the CPU 220 selects the encryption key information 1 from the encryption information table 240 identical to the encryption information table 130 of FIG. 2. The CPU 220 judges whether or not the equipment identifier BSSID_A included in the encryption key information 1 coincides with the equipment identifier BSSID_B included in the wireless connection setting information 230. In this case, the equipment identifiers do not coincide with each other, and therefore, the CPU 220 selects the next encryption key information 2. The CPU 220 judges that the equipment identifier BSSID_A included in the encryption key information 2 does also not coincide with the equipment identifier BSSID_B included in the wireless connection setting information 230.

Next, the CPU 220 selects the next encryption key information 3. In this case, the equipment identifier BSSID_B included in the encryption key information 3 coincides with the equipment identifier BSSID_B included in the wireless connection setting information 230, and therefore, the CPU 220 sets the encryption key information for wireless communications to the encryption key information 3, and ends the encryption key information selecting process of FIG. 5. When the equipment identifier included in the wireless connection setting information 230 is, for example, BSSID_C, encryption key information for wireless communications is set to the encryption key information 1 in the encryption key information selecting process of FIG. 5. After the encryption key information selecting process, the wireless communication apparatus 20 wirelessly transmits the connection request signal S415 (See FIG. 3) to the wireless communication apparatus 10 by using the encryption key information 3, and performs wireless communications with the wireless communication apparatus 10. In this case, the CPU 120 of the wireless communication apparatus 10 controls the wireless communication interface circuit 110 to perform wireless communications by using the wireless communication circuit 112, and the CPU 220 of the wireless communication apparatus 20 controls the wireless communication interface circuit 210 to perform wireless communications by using the wireless communication circuit 212.

As described above, when the wireless connection setting process at step S409 of FIG. 3 was performed in the frequency band of the 5-GHz band, the wireless communication apparatus 20 can set the encryption key information so as to transmit and receive the encrypted transmission data in the 5-GHz band continuously. According to the present preferred embodiment, in a case where wireless communications are performed in the wireless connection setting process at step S409 of FIG. 3 within a frequency band in which interference among wireless signals hardly occurs when wireless communications can be performed in the 2.4-GHz band and the 5-GHz band, wireless communications can be performed by selecting the encryption key information so as to perform wireless communications continuously within the frequency band in which interference among wireless signals hardly occurs.

(2) Second Operation Example

In the second operation example, it is assumed that the wireless connection setting process was executed in the 2.4-GHz band by using the wireless communication circuits 111 and 211 at step S409 of FIG. 3. In this case, the wireless communication apparatus 20 acquires the equipment identifier BSSID_A of the wireless communication circuit 111, and stores the acquired equipment identifier BSSID_A and the information on the frequency band (2.4-GHz band) for use in the wireless communication circuit 211 used when the wireless connection setting process was executed, as the wireless connection setting information 230 into the memory 250 at step S300 of FIG. 4. Then, the CPU 220 acquires the encryption key information table 130 of the wireless communication apparatus 10 at step S301 of FIG. 4, stores the encryption key information table 130 as the encryption information table 240 into the memory 250, and disconnects the wireless connection between the wireless communication apparatuses 10 and 20 at step S302.

In the present operation example, the information on the frequency band included in the wireless connection setting information 230 is the information on the 2.4-GHz band (NO at step S10 of FIG. 5), and therefore, the CPU 220 executes the second selecting process of FIG. 7. First of all, in the second selecting process, the CPU 220 selects the encryption key information 1 from the encryption information table 240 identical to the encryption information table 130 of FIG. 2. The CPU 220 judges whether or not the equipment identifier BSSID_A included in the encryption key information 1 coincides with the equipment identifier BSSID_A included in the wireless connection setting information 230. In this case, both of the equipment identifiers coincide with each other, and therefore, the CPU 220 selects the next encryption key information 2. The CPU 220 judges that the equipment identifier BSSID_A included in the encryption key information 2 also coincide with the equipment identifier BSSID_A included in the wireless connection setting information 230.

Next, the CPU 220 selects the encryption key information 3. In this case, since the equipment identifier BSSID_B included in the encryption key information 3 does not coincide with the equipment identifier BSSID_A included in the wireless connection setting information 230, the CPU 220 sets the encryption key information for wireless communications to the encryption key information 3, and ends the encryption key information selecting process of FIG. 5. When the equipment identifier included in the wireless connection setting information 230 is, for example, BSSID_C, the encryption key information for wireless communications is set to the encryption key information 1 in the encryption key information selecting process of FIG. 5. After the encryption key information selecting process, the wireless communication apparatus 20 wirelessly transmits the connection request signal S415 (See FIG. 3) to the wireless communication apparatus 10 by using the encryption key information 3, and performs wireless communications with the wireless communication apparatus 10. In this case, the CPU 120 of the wireless communication apparatus 10 controls the wireless communication interface circuit 110 to perform wireless communications by using the wireless communication circuit 112, and the CPU 220 of the wireless communication apparatus 20 controls the wireless communication interface circuit 210 to perform wireless communications by using the wireless communication circuit 212.

As described above, the wireless communication apparatus 20 can set the encryption key information for wireless communications so as to transmit and receive encrypted transmission data in the 5-GHz band even when the wireless connection setting process at step S409 of FIG. 3 was executed in the frequency band of the 2.4-GHz band. According to the present preferred embodiment, in a case where wireless communications are performed in the wireless connection setting process at step S409 of FIG. 3 within a frequency band in which the interference among wireless signals easily occurs when wireless communications can be performed within the 2.4-GHz band and the 5-GHz band, the encryption key information can be selected so as to perform wireless communications within a frequency band in which the interference among wireless signals hardly occurs. Namely, even when wireless communications are performed in the frequency band in which the interference among wireless signals easily occurs in the wireless connection setting process at step S409, wireless communications can be performed in the frequency band in which the interference among wireless signals hardly occurs.

As described above in detail, the wireless communication apparatus 20 is configured to include the wireless communication circuit 212 that performs wireless communications with the wireless communication circuit 112 in the 5-GHz band, the wireless communication circuit 211 that performs wireless communications with the wireless communication circuit 111 in the 2.4-GHz band, and the CPU 220 that controls the wireless communication circuits 211 and 212. In this case, by using one wireless communication circuit of the wireless communication circuits 211 and 212, the CPU 220 receives the equipment identifier BSSID_B of the wireless communication circuit 112 or the equipment identifier BSSID_A of the wireless communication circuit 111 from the wireless communication apparatus 10, and receives the encryption key information 1 to 4 from the wireless communication apparatus 10. In addition, when the aforementioned one wireless communication circuit is the wireless communication circuit 212, the CPU 220 sets the encryption key information for wireless communications with the wireless communication apparatus 10 to the encryption key information including the equipment identifier that coincides with the received equipment identifier among the received encryption key information 1 to 4, and controls the wireless communication circuit 212 to transmit and receive the transmission data encrypted by using the key data included in the set encryption key information to and from the wireless communication apparatus 10. On the other hand, when the aforementioned one wireless communication circuit is the wireless communication circuit 212, the CPU 220 sets the encryption key information for wireless communications with the wireless communication apparatus 10 to the encryption key information including the equipment identifier that does not coincide with the received equipment identifier among the received encryption key information 1 to 4, and controls the wireless communication circuit 212 to transmit and receive the transmission data encrypted by using the key data included in the set encryption key information to and from the wireless communication apparatus 10.

Therefore, according to the present preferred embodiment, the wireless communication apparatus 20 can set the frequency band for transmitting and receiving the encrypted transmission data to the 5-GHz band, based on the equipment identifier received from the wireless communication apparatus 10 and the encryption key information 1 to 4, and a stable wireless LAN communication environment can be provided for the user. In addition, since the wireless communication apparatus 20 receives the equipment identifier from the wireless communication apparatus 10 by the wireless connection setting process compliant with WPS, the user is only required to perform comparatively simple operation for shifting the wireless communication apparatuses 10 and 20 to the WPS mode.

It is noted that the contents of the encryption information table 130 are not limited to those shown in FIG. 2. In the present preferred embodiment, the encryption information table 130 is required to include a plurality of encryption key information, and each of the encryption key information is required to include key data for encrypting the transmission data, and the equipment identifier of the wireless communication circuit 111 or 112 to transmit and receive the encrypted transmission data.

Second Preferred Embodiment

In the first preferred embodiment, the encryption key information including the equipment identifier that has first coincided (YES at step S21 of FIG. 6) or the encryption key information including the equipment identifier that has not first coincided (NO at step S31 of FIG. 7) with the equipment identifier included in the wireless connection setting information 230 is selected among the encryption key information 1 to 4 included in the encryption information table 240 (step S502). On the other hand, in the present preferred embodiment, when the encryption key information 1 to 4 included in the encryption information table 240 includes a plurality of equipment identifiers that do or do not coincide with the equipment identifiers included in the wireless connection setting information 230, the encryption key information of the highest encryption strength is selected.

Figure 8:
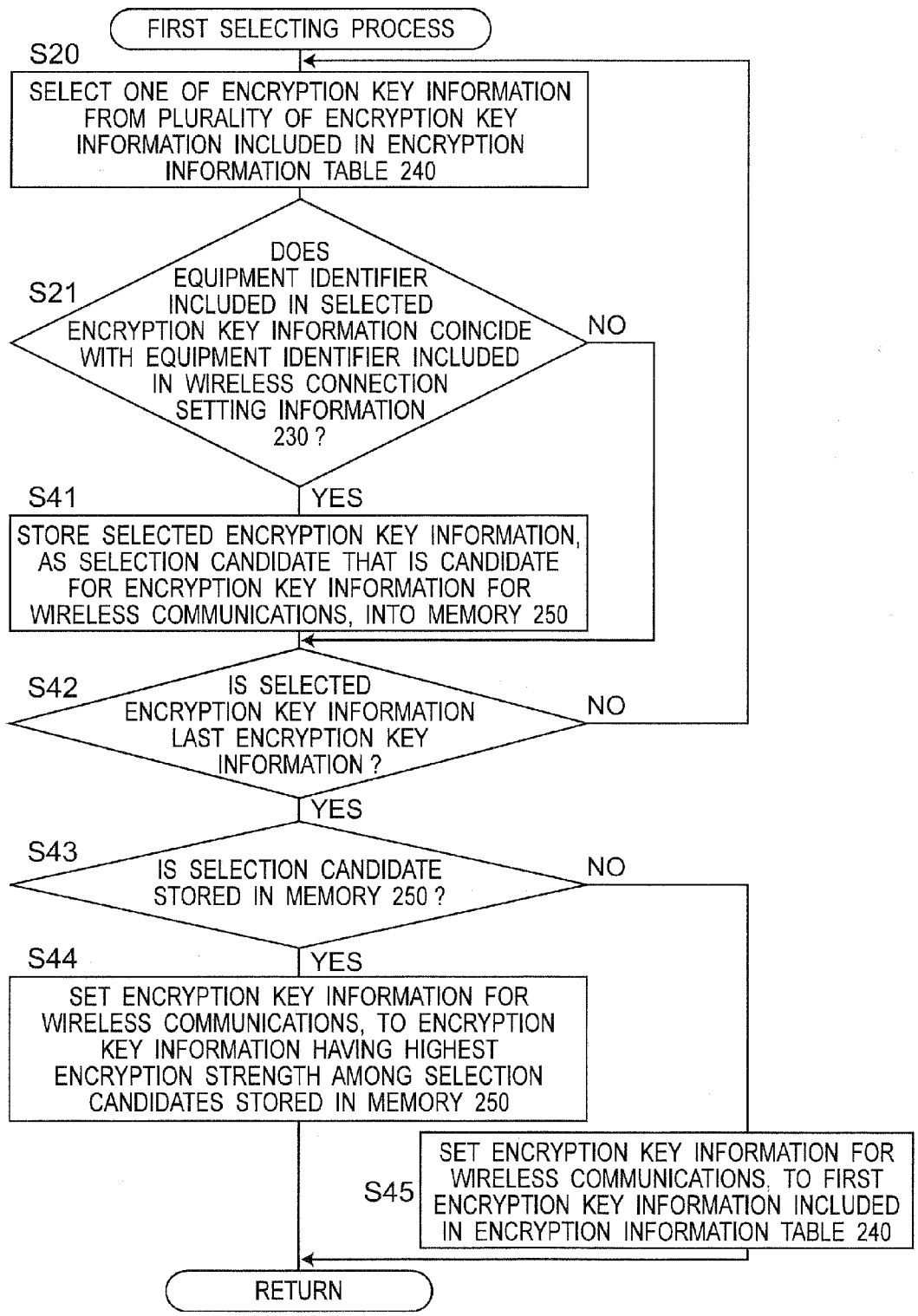
FIG. 8 is a flow chart showing a first selecting process according to the second preferred embodiment of the present disclosure executed at step S11 of FIG. 5.

FIG. 8 is a flow chart showing a first selecting process according to the second preferred embodiment of the present disclosure executed at step S11 of FIG. 5. At step S20 of FIG. 8, the CPU 220 selects one encryption key information from the plurality of encryption key information included in the encryption information table 240. Next, the CPU 220 judges at step S21 whether or not the equipment identifier included in the selected encryption key information coincides with the equipment identifier included in the wireless connection setting information 230. If YES at step S21, then the control flow goes to step S41. On the other hand, if NO at step S21, then the control flow goes to step S42.

At step S41 of FIG. 8, the CPU 220 stores the selected encryption key information, as a selection candidate that is a candidate for the encryption key information for wireless communications, into the memory 250, and the control flow goes to step S42. The CPU 220 judges at step S42 whether or not the selected encryption key information is the last encryption key information. If YES at step S42, then the control flow goes to step S43. On the other hand, if NO at step S42, then the control flow returns to step S20. Further, the CPU 220 judges at step S43 whether or not the selection candidate is stored in the memory 250. If YES at step S43, then the control flow goes to step S44. On the other hand, if NO at step S43, then the control flow goes to step S45.

At step S44 of FIG. 8, the CPU 220 sets the encryption key information for wireless communications, to the encryption key information that has the highest encryption strength among the selection candidates stored in the memory 250, and the control flow returns to the encryption key information selecting process of FIG. 5. On the other hand, at step S45, the CPU 220 sets the encryption key information for wireless communications, to the first encryption key information included in the encryption information table 240, and the control flow returns to the encryption key information selecting process of FIG. 5.

Figure 9:
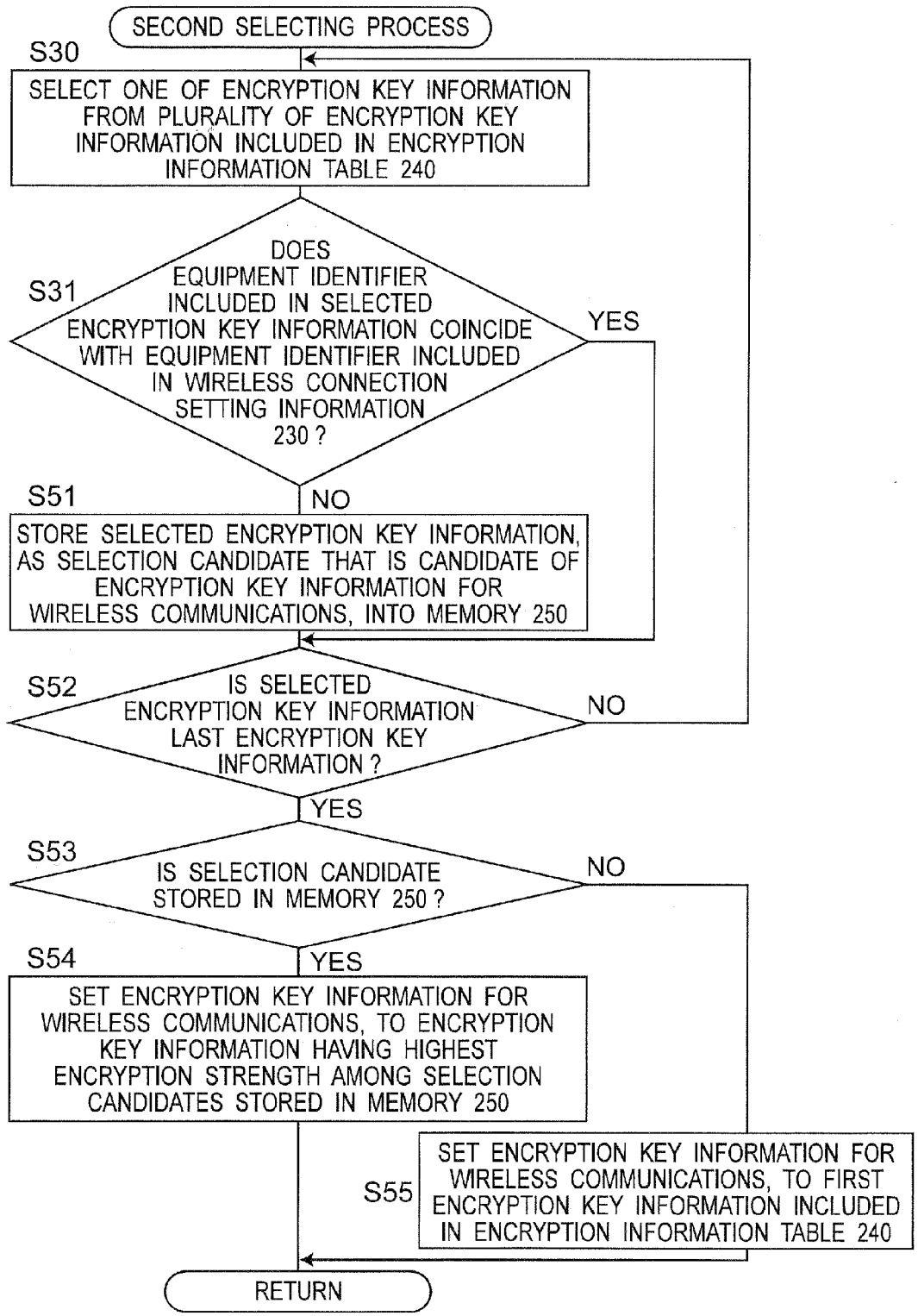
FIG. 9 is a flow chart showing a second selecting process according to the second preferred embodiment of the present disclosure executed at step S12 of FIG. 5.

FIG. 9 is a flow chart showing a second selecting process according to the second preferred embodiment of the present disclosure executed at step S12 of FIG. 5. At step S30 of FIG. 9, the CPU 220 selects one encryption key information from the plurality of encryption key information included in the encryption information table 240. Next, the CPU 220 judges at step S31 whether or not the equipment identifier included in the selected encryption key information coincides with the equipment identifier included in the wireless connection setting information 230. If YES at step S31, then the control flow goes to step S52. On the other hand, if NO at step S31, then the control flow goes to step S51.

At step S51 of FIG. 9, the CPU 220 stores the selected encryption key information as a selection candidate that is the candidate for encryption key information for wireless communications, into the memory 250, and the control flow goes to step S52. The CPU 220 judges at step S52 whether or not the selected encryption key information is the last encryption key information. If YES at step S52, then the control flow goes to step S53. On the other hand, if NO at step S52, then the control flow returns to step S30. Further, the CPU 220 judges at step S53 whether or not the selection candidate is stored in the memory 250. If YES at step S53, then the control flow goes to step S54. On the other hand, if NO at step S53, then the control flow goes to step S55.

At step S54 of FIG. 9, the CPU 220 sets the encryption key information for wireless communications, to the encryption key information that has the highest encryption strength among the selection candidates stored in the memory 250, and the control flow returns to the encryption key information selecting process of FIG. 5. On the other hand, at step S55, the CPU 220 sets the encryption key information for wireless communications, to the first encryption key information included in the encryption information table 240, and the control flow returns to the encryption key information selecting process of FIG. 5.

Next, there is described a concrete operation example of the wireless communication apparatus of FIG. 1 in a case where the first selecting process of FIG. 8 and the second selecting process of FIG. 9 are executed. In the present operation example, it is assumed that the wireless connection setting process was executed in the 5-GHz band by using the wireless communication circuits 112 and 212 at step S409 of FIG. 3 in a manner similar to that of the aforementioned first operation example of the first preferred embodiment. In this case, at step S300 of FIG. 4, the wireless communication apparatus 20 acquires the equipment identifier BSSID_B of the wireless communication circuit 112, and stores the acquired equipment identifier BSSID_B and the information on the frequency band (5-GHz band) for use in the wireless communication circuit 212 used when the wireless connection setting process was executed, as the wireless connection setting information 230 into the memory 250. Then, at step S301 of FIG. 4, the CPU 220 acquires the encryption key information table 130 of the wireless communication apparatus 10, stores the received encryption key information table 130 as the encryption information table 240 into the memory 250, and disconnects the wireless connection between the wireless communication apparatuses 10 and 20 at step S302.

In the present operation example, the information on the frequency band included in the wireless connection setting information 230 is the information on the 5-GHz band (YES at step S10 of FIG. 5), and therefore, the CPU 220 executes the first selecting process of FIG. 8. First of all, in the first selecting process, the CPU 220 selects the encryption key information 1 from the encryption information table 240 identical to the encryption information table 130 of FIG. 2. The CPU 220 judges whether or not the equipment identifier BSSID_A included in the encryption key information 1 coincides with the equipment identifier BSSID_B included in the wireless connection setting information 230. In this case, since the equipment identifiers do not coincide with each other, the CPU 220 selects the next encryption key information 2. The CPU 220 judges that the equipment identifier BSSID_A included in the encryption key information 2 does also not coincide with the equipment identifier BSSID_B included in the wireless connection setting information 230.

Next, the CPU 220 selects the next encryption key information 3. In this case, the equipment identifier BSSID_B included in the encryption key information 3 coincides with the equipment identifier BSSID_B included in the wireless connection setting information 230, and therefore, the CPU 220 stores the encryption key information 3 as a selection candidate into the memory 250. Next, the CPU 220 selects the next encryption key information 4. In this case, the equipment identifier BSSID_B included in the encryption key information 4 coincides with the equipment identifier BSSID_B included in the wireless connection setting information 230, and therefore, the CPU 220 stores also the encryption key information 4 as a selection candidate into the memory 250. The CPU 220 judges whether or not the selection candidate is stored in the memory 250 after executing the judging process at step S31 of FIG. 8 for all of the encryption key information in the encryption information table 240.

Since the encryption key information 3 and 4 are stored as selection candidates in the memory 250 in the present operation example, the CPU 220 selects the encryption key information of the encryption type of a high encryption strength out of the encryption key information 3 and 4. Concretely speaking, the encryption type AES of the encryption key information 3 has an encryption strength higher than that of the encryption type TKIP of the encryption key information 4, and therefore, the CPU 220 sets the encryption key information for wireless communications to the encryption key information 3, and ends the encryption key information selecting process of FIG. 5. The encryption key information 3 is selected. When the equipment identifier included in the wireless connection setting information 230 is, for example, BSSID_C, the encryption key information for wireless communications is set to the encryption key information 1 in the encryption key information selecting process of FIG. 5.

As described above, according to the present preferred embodiment, when the encryption key information table 240 includes a plurality of encryption key information for an identical frequency band, the encryption key information of the highest encryption strength can be selected from among the plurality of encryption key information.

The wireless communication apparatuses 10 and 20 perform wireless communications by using the two frequency bands of the 2.4-GHz band and the 5-GHz band in each of the aforementioned preferred embodiments, however, the present disclosure is not limited to this. The wireless communication apparatuses 10 and 20 may perform wireless communications by using two frequency bands other than the 2.4-GHz band and the 5-GHz band. Further, the wireless communication apparatuses 10 and 20 may perform wireless communications by using a plurality of three or more frequency bands.

In addition, the wireless communication apparatus 10 transmits all of the encryption key information 1 to 4 in the encryption information table 130 to the wireless communication apparatus 20 in the key exchanging process at step S411 of FIG. 3 in each of the aforementioned preferred embodiments, however, the present disclosure is not limited to this. The wireless communication apparatus 10 may transmit only the encryption key information that includes the equipment identifier corresponding to the frequency band for use in the wireless connection setting process at step S409 of FIG. 3 among the encryption key information 1 to 4 included in the encryption information table 130 to the wireless communication apparatus 20. In this case, when the beacon signal S404 can be received by both of the wireless communication circuits 211 and 212, the wireless communication apparatus 20 should preferably perform transmitting and receiving of the connection request signal S407 and the connection response signal S408 and the wireless connection setting process by using the wireless communication circuit 212 for wireless communications in the 5-GHz band.

Further, the program including the steps of the wireless connection process of FIG. 4 and the encryption key information selecting process of FIG. 5 is executed by the CPU 220 in each of the aforementioned preferred embodiments, however, the present disclosure is not limited to this. The functions of the parts of the wireless communication apparatuses 10 and 20 of FIG. 1 may be implemented by hardware. When software of the aforementioned program is used, the setting and processing contents can be changed easily. Still further, the aforementioned program may be stored into a recording medium such as ROM (Read Only Memory) that can be read by a computer. The aforementioned program may be transmitted to a computer via the Internet, light, radio waves, or the like, and may be executed by the computer.

According to the wireless communication apparatus and the wireless communication method of the present disclosure, the controller receives the first or second equipment identifier from the first wireless communication apparatus, by using one wireless communication circuit of the third and fourth wireless communication circuits. The controller receives the plurality of encryption key information from the first wireless communication apparatus. When the one wireless communication circuit is the third wireless communication circuit, the controller sets the encryption key information for wireless communications with the first wireless communication apparatus, to encryption key information including an equipment identifier that coincides with a received equipment identifier among the received plurality of encryption key information, and controls the third wireless communication circuit to transmit and receive the encrypted transmission data to and from the first wireless communication apparatus by using the key data included in set encryption key information. When the one wireless communication circuit is the fourth wireless communication circuit, the controller sets the encryption key information for wireless communications with the first wireless communication apparatus to encryption key information including an equipment identifier that does not coincide with the received equipment identifier among the received plurality of encryption key information, and controls the third wireless communication circuit to transmit and receive the encrypted transmission data to and from the first wireless communication apparatus by using the key data included in set encryption key information. Therefore, the frequency band for wireless communications using the encryption key information can be set to the first frequency band based on the equipment identifier and the plurality of encryption key information received from the first wireless communication apparatus.

The wireless communication apparatus and the wireless communication method of the present disclosure are useful as a wireless communication apparatus that transmits data required to have confidentialities of texts, still pictures, sounds and moving video pictures, and a wireless communication method for the wireless communication apparatus.

Although the present disclosure has been fully described in connection with the preferred embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A wireless communication apparatus that is a second wireless communication apparatus operable to transmit and receive encrypted transmission data to and from a first wireless communication apparatus comprising first and second wireless communication circuits, the first wireless communication circuit having a first equipment identifier and executing wireless communications in a predetermined first frequency band, the second wireless communication circuit having a second equipment identifier and executing wireless communications in a predetermined second frequency band, the first wireless communication apparatus transmitting a plurality of encryption key information each including key data for encrypting transmission data and the equipment identifier of the first or second wireless communication circuit,
    wherein the second wireless communication apparatus comprises:
    a third wireless communication circuit that executes wireless communications with the first wireless communication circuit in the first frequency band;
    a fourth wireless communication circuit that executes wireless communications with the second wireless communication circuit in the second frequency band; and
    a controller that controls the third and fourth wireless communication circuits,
    wherein the controller receives the first or second equipment identifier and the plurality of encryption key information from the first wireless communication apparatus, by using one of the third and fourth wireless communication circuits corresponding to the first or second wireless communication circuit that transmitted the first or second equipment identifier,
    the controller selects one of a first selection process and a second selection process based on a comparison of what equipment identifier is received by what wireless communication circuit, and executes the selected selection process, when the third wireless communication circuit is used to receive the first equipment identifier, the first selection process is selected, and when the fourth wireless communication circuit is used to receive the second equipment identifier, the second selection process is selected, and wherein, in the first selection process, the controller selects one encryption key information including an equipment identifier that coincides with the received first equipment identifier from among the received plurality of encryption key information, in the second selection process, the controller selects one encryption key information including an equipment identifier that does not coincide with the received second equipment identifier from among the received plurality of encryption key information, and the controller sets the encryption key information for wireless communications with the first wireless communication apparatus to the selected encryption key information.

2. The wireless communication apparatus as claimed in claim 1, wherein the equipment identifier is BSSID (Basic Service Set Identifier).

3. The wireless communication apparatus as claimed in claim 1, wherein the first frequency band is a 5-GHz band, and the second frequency band is a 2.4-GHz band.

4. The wireless communication apparatus as claimed in claim 1, wherein the controller receives the first or second equipment identifier from the first wireless communication apparatus by executing a predetermined process compliant with WPS (Wi-Fi Protected Setup) Standard.

5. A wireless communication method for a second wireless communication apparatus operable to transmit and receive encrypted transmission data to and from a first wireless communication apparatus comprising first and second wireless communication circuits, the first wireless communication circuit having a first equipment identifier and executing wireless communications in a predetermined first frequency band, the second wireless communication circuit having a second equipment identifier and executing wireless communications in a predetermined second frequency band, the first wireless communication apparatus transmitting a plurality of encryption key information each including key data for encrypting transmission data and the equipment identifier of the first or second wireless communication circuit, wherein the second wireless communication apparatus comprises:

a third wireless communication circuit that executes wireless communications with the first wireless communication circuit in the first frequency band;

a fourth wireless communication circuit that executes wireless communications with the second wireless communication circuit in the second frequency band; and a controller that controls the third and fourth wireless communication circuits, and wherein the wireless communication method includes steps executed by the controller of:

receiving the first or second equipment identifier and the plurality of encryption key information from the first wireless communication apparatus by using one of the third and fourth wireless communication circuits corresponding to the first or second wireless communication circuit that transmitted the first or second equipment identifier, selecting one of a first selection process and a second selection process based on a comparison of what equipment identifier is received by what wireless communication circuit, and executing the selected process, selecting the first selection process when the third wireless communication circuit is used to receive the first equipment identifier, and selecting the second selection process when the fourth wireless communication circuit is used to receive the second equipment identifier, wherein, in the first selection process, the controller selects one encryption key information including an equipment identifier that coincides with the received first equipment identifier from among the received plurality of encryption key information, in the second selection process, the controller selects one encryption key information including an equipment identifier that does not coincide with the received second equipment identifier from among the received plurality of encryption key information, and the controller sets the encryption key information for wireless communications with the first wireless communication apparatus to the selected encryption key information.

* * * * *